US012276261B2

(12) United States Patent
Alberts et al.

(10) Patent No.: US 12,276,261 B2
(45) Date of Patent: Apr. 15, 2025

(54) WIND TURBINE CONTROL ARRANGEMENT

(71) Applicant: Siemens Gamesa Renewable Energy A/S, Brande (DK)

(72) Inventors: Johannes Gerhardes Wardjan Alberts, Brøndby Strand (DK); Bjarne Skovmose Kallesøe, Bagsværd (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 51 days.

(21) Appl. No.: 17/924,233

(22) PCT Filed: Apr. 29, 2021

(86) PCT No.: PCT/EP2021/061218
§ 371 (c)(1),
(2) Date: Nov. 9, 2022

(87) PCT Pub. No.: WO2021/228561
PCT Pub. Date: Nov. 18, 2021

(65) Prior Publication Data
US 2023/0175485 A1 Jun. 8, 2023

(30) Foreign Application Priority Data
May 12, 2020 (EP) .................... 20174039

(51) Int. Cl.
*F03D 7/02* (2006.01)
*F03D 7/04* (2006.01)
*F03D 17/00* (2016.01)

(52) U.S. Cl.
CPC .......... *F03D 7/0276* (2013.01); *F03D 17/011* (2023.08); *F03D 17/026* (2023.08);
(Continued)

(58) Field of Classification Search
CPC ...... F03D 7/0276; F03D 7/0292; F03D 7/048; F03D 7/049; F03D 17/008; F03D 17/011;
(Continued)

(56) References Cited

U.S. PATENT DOCUMENTS

| 8,853,877 B1 | 10/2014 | Zalar et al. |
| 2013/0103202 A1 | 4/2013 | Bowyer et al. |

(Continued)

FOREIGN PATENT DOCUMENTS

| DE | 102018100127 A1 | 7/2019 |
| DE | 102018124084 A1 | 4/2020 |

(Continued)

OTHER PUBLICATIONS

PCT International Search Report and Written Opinion of International Searching Authority mailed Aug. 10, 2021 corresponding to PCT International Application No. PCT/EP2021/061218 filed Apr. 29, 2021.

*Primary Examiner* — Christopher Verdier
(74) *Attorney, Agent, or Firm* — Schreiser, Olsen & Watts LLP

(57) ABSTRACT

A control arrangement for a variable-speed wind turbine includes a loading analysis module configured to analyse a number of environment values to establish whether the momentary wind turbine loading is lower than a loading threshold when the rotational speed of the aerodynamic rotor has reached its rated value; and a speed boost module configured to determine a speed increment for the rotational speed of the aerodynamic rotor if the wind turbine loading is lower than the loading threshold.

14 Claims, 4 Drawing Sheets

(52) U.S. Cl.
CPC .............. *F03D 7/048* (2013.01); *F03D 7/049* (2023.08); *F03D 17/008* (2023.08); *F05B 2270/101* (2013.01); *F05B 2270/1011* (2013.01); *F05B 2270/1016* (2013.01); *F05B 2270/1033* (2013.01); *F05B 2270/204* (2020.08); *F05B 2270/327* (2013.01); *F05B 2270/328* (2013.01); *F05B 2270/329* (2013.01); *F05B 2270/331* (2013.01); *F05B 2270/332* (2013.01); *F05B 2270/335* (2013.01)

(58) Field of Classification Search
CPC ............ F03D 17/026; F05B 2270/1033; F05B 2270/204; F05B 2270/327; F05B 2270/328; F05B 2270/329; F05B 2270/101; F05B 2270/1011; F05B 2270/331; F05B 2270/332; F05B 2270/1016; F05B 2270/335
See application file for complete search history.

(56) References Cited

U.S. PATENT DOCUMENTS

| | | |
|---|---|---|
| 2013/0320674 A1 | 12/2013 | Ingram |
| 2018/0363628 A1 | 12/2018 | Risdon et al. |
| 2021/0017957 A1 | 1/2021 | Messing et al. |
| 2022/0034296 A1* | 2/2022 | Messing ............... F03D 7/0292 |

FOREIGN PATENT DOCUMENTS

| | | | |
|---|---|---|---|
| EP | 2128437 A2 | 12/2009 | |
| EP | 3415752 A1 | 12/2018 | |
| WO | WO-2011157271 A2 * | 12/2011 | ........... F03D 7/0224 |

* cited by examiner

WIND TURBINE CONTROL ARRANGEMENT

CROSS-REFERENCE TO RELATED APPLICATIONS

This application claims priority to PCT Application No. PCT/EP2021/061218, having a filing date of Apr. 29, 2021, which claims priority to EP Application Serial No. 20174039.6, having a filing date of May 12, 2020.

FIELD OF TECHNOLOGY

The following relates to a wind turbine control arrangement, and a method of operating a variable-speed wind turbine.

BACKGROUND

It is generally desired to maximise the annual energy production (AEP) of a wind turbine. In effect, this means that the wind turbine should generate as much output power as possible. However, it is not always possible for a wind turbine to operate at its highest output power level. For example, the rotational speed of the aerodynamic rotor may need to be reduced in order to avoid damage to the rotor blades, especially if the rotor blades are very long.

The prevailing conditions can differ widely between wind park sites. Therefore, to avoid over-engineering, a wind turbine is generally designed for a specific wind class. The most prevalent "wind class II" wind turbine can deal with mean wind speeds up to 8.5 m/s. A "wind class III" wind turbine is designed for mean wind speeds less than 7.5 m/s, and can have long rotor blades and a tall tower; and a "wind class I" wind turbine is constructed for higher mean wind speeds in excess of 8.5 m/s and must have shorter rotor blades and a shorter tower to avoid excessive structural loading. Turbulence intensity (a measure of the extent by which the wind varies within ten minutes) is also taken into account by further refining the wind classes. For example, "wind class IIa" is for a site with 18% turbulence intensity, while "wind class IIb" is for a site with 16% turbulence intensity. These classes are defined by the IEC 61400-1 standard. A wind turbine with a certain turbine class is then specifically suited for installation at a site for which the normal wind conditions are defined by specific values of average wind speed, extreme 50-year gust, and turbulence intensity. The achievable AEP of a wind turbine will depend to a large extent on its wind class.

Generally speaking, the rotational speed of the aerodynamic rotor and the output power of a wind turbine are directly related to wind speed. The fraction of the power in the wind that can be extracted by the wind turbine and converted to electrical power is referred to as the power coefficient $C_P$. The power coefficient is a function of tip-speed ratio and rotor blade pitch angle, and the tip-speed ratio is the ratio between rotor blade tip speed and wind speed. At a certain wind speed, the output power of a variable-speed wind turbine is defined by a power/speed curve which has a maximum at a specific rotational speed of the aerodynamic rotor. The curve or locus defined by the power output maxima over a range of wind speeds is its ideal trajectory $T_{ideal}$ shown in FIG. 6. Any departure from the ideal trajectory lowers the power coefficient of that wind turbine.

The rated speed of a wind turbine will depend on its "wind class", and is essentially the upper limit for that wind turbine type. As shown in FIG. 6, the rated speed $\omega_{rated}$ for a wind turbine is therefore the rotational speed corresponding to the maximum of the power/speed curve $Cv_{max}$ for a specific upper limit wind speed. As long as the wind speed is lower than that upper limit wind speed, the control algorithm will adjust the pitch and torque references so that the rotational speed follows the ideal trajectory $T_{ideal}$.

However, the rated rotor speed of a variable-speed wind turbine is generally reached before the rated power, i.e. the wind turbine has the potential to generate more power even when its rotational speed has reached the maximum of the power/speed curve for the upper limit wind speed. In a prior art approach, the output power is boosted by means of physical rotor blade add-ons such as trailing-edge serrations, vortex generators etc. The wind turbine is controlled to maintain the rated rotational speed, while the output power can increase. This region of the power/speed chart may be referred to as the "constant speed zone" and is indicated as the vertical trajectory $T_{CSZ}$ in FIG. 6. When operated in this zone, the aerodynamic performance of the wind turbine is sub-optimal.

There are a number of known control methods that can be applied in order to improve a wind turbine's AEP. In one approach, wind turbine loading (the loads acting on the rotor blades, the tower, etc.) is continually monitored, and rotational speed and/or output power are increased above their rated levels as long as the loading remains below a threshold of acceptance. In another approach, the wind turbine operates at or above rated levels and is curtailed only when conditions (and therefore loading) become severe.

However, the known control strategies generally focus on how to operate a wind turbine to avoid damage from extreme operating conditions and can generally be regarded as pre-emptive curtailment strategies, but these known control strategies do not make any attempts to exploit other non-extreme operating conditions.

An aspect therefore relates to provide an improved way of controlling a wind turbine.

SUMMARY

According to embodiments of the invention, the wind turbine control arrangement for a variable-speed wind turbine constructed to fulfil the requirements of a wind class as defined by IEC 61400-1 comprises a loading analysis module configured to establish whether the momentary wind turbine loading is lower than a loading threshold while the rotational speed of the aerodynamic rotor is at or close to its rated value, which is associated with a level of output power that is less than the rated output power for that class of wind turbine. The control arrangement further comprises a speed boost module configured to determine a speed increment for the rotational speed of the aerodynamic rotor if the loading is less than the loading threshold. The speed increment will allow the wind turbine to more closely follow its ideal power/speed trajectory $T_{ideal}$.

Embodiments of the invention are based on the insight that the turbulence intensity levels used in the IEC 61400-1 standard are 90% quantile. This means that during 90% of its operational lifetime, a wind turbine will be exposed to less severe turbulence and—during such times—will be subject to less loading than permitted by its specification. Embodiments of the invention take the approach of identifying "mild" conditions during which the rotor speed can be boosted in such a way to follow the ideal power/speed trajectory. This is in contrast to the sub-optimal "constant speed zone" approach known from the prior art, i.e. the strategy of keeping the rotational speed constant while allowing output power to increase when the wind speed increases above specification level.

In the context of embodiments of the invention, the purpose of the loading analysis module is to identify a "mild" environmental condition in which the wind turbine is running at its rated speed but is not being operated to extract the maximum amount of energy from the wind. The loading analysis module may therefore be referred to as a "mild environmental condition analyser" (MECA) in the following.

The inventive method of operating a variable-speed wind turbine comprises the steps of establishing whether the loading is lower than a loading threshold when the rotational speed as at or close to the rated speed; and determining a speed increment for the rotational speed of the aerodynamic rotor on the basis of a power/speed trajectory of the wind turbine if the observed loading is lower than the loading threshold.

Features of different claim categories may be combined as appropriate to give further embodiments not described herein. In the following, it may be assumed that wind turbine is a variable-speed direct-drive wind turbine. Such a wind turbine generally comprises a summation module for subtracting the momentary rotational speed of the aerodynamic rotor from a reference speed, and passing the difference or error signal to a speed control block. To implement the inventive method, this summation module (generally realised in the form of software) is configured to add the speed increment, so that the speed error signal is incremented by that amount. Depending on the mildness of the environmental conditions, the speed increment can be an integer number of radians per second, or a fraction less than unity.

In the following, without restricting embodiments of the invention in any way, it may be assumed that the wind turbine is constructed to fulfil the requirements of a wind class such as wind class IIa or wind class IIb as defined by IEC 61400-1.

The environment values can comprise any of: a blade load value, a turbulence intensity value, a tower acceleration value, a yaw position value, or any other relevant value.

The turbulence intensity seen by a wind turbine is a highly-relevant factor in assessing the momentary loading on the wind turbine. The turbulence intensity can be estimated using a LIDAR device, and a suitable LIDAR device can be arranged to provide data to the loading analysis module. The turbulence intensity can also be estimated or determined by analysing various other parameters. Therefore, in a further preferred embodiment of the invention, the loading analysis module is configured to receive a rotor blade pitch position value, an active power value and a rotor speed value, and the loading analysis module can include a turbulence estimator unit that is configured to estimate a local turbulence intensity on the basis of these parameters. For example, the standard deviation of aerodynamic rotor speed can be used to estimate the turbulence intensity.

The individual contribution of each monitored parameter is preferably determined under consideration of the nature of that parameter. To this end, the processing of a parameter preferably involves passing it through a filter and/or subjecting it to an operator and/or comparing it to a threshold and/or multiplying it by a gain factor, whereby these stages can be applied in any appropriate order.

In this way, the loading analysis module computes the partial contribution of each environment value, and these are summed together. The value of the resulting sum will be an indication as to whether or not the rotational speed may be increased above the rated speed for that wind turbine. For example, if the MECA has concluded that the rated-speed loading of the wind turbine is in fact less than allowed by the wind turbine specification, it can issue permission to boost the rotor speed. As a result, the controller may respond by increasing or boosting the rotor speed by a predetermined increment, for example by 0.5 rad/s, by 2 rad/s, etc. The speed boost increment may be determined on the basis of the wind turbine's turbulence class and/or its wind class.

The magnitude of the speed increment may decrease with increasing departure from the rated speed, for example a first speed increment may add 2 rad/s to the rated speed; but if the rotor speed is already 5 rad/s greater than the rated speed, any further speed increment may be in steps of 0.1 rad/s.

The magnitude of the speed increment may be in proportion to the difference between actual loading and the loading threshold, e.g. a speed increment may add 2 rad/s to the rated speed if the actual loading is only 80% of the loading threshold; but if the actual loading is 95% of the loading threshold, any further speed increment may be limited to a smaller value such as 0.1 rad/s.

In a particularly preferred embodiment of the invention, the wake exposure of the wind turbine is preferably also taken into consideration. To this end, the loading analysis module is configured to determine the wake exposure of the wind turbine. The wake exposure can be determined from a look-up table using knowledge of the wind turbine's position in a wind park, its yaw attitude, and various other relevant parameters. On the basis of the determined wake exposure, the loading analysis module may overrule the speed boost permission described above if the wake exposure is considered critical, or approve the speed boost permission if the wake exposure is considered non-critical.

BRIEF DESCRIPTION

It is to be understood, however, that the drawings are designed solely for the purposes of illustration and not as a definition of the limits of the invention. Some of the embodiments will be described in detail, with reference to the following figures, wherein like designations denote like members, wherein.

DETAILED DESCRIPTION

Figure 1:
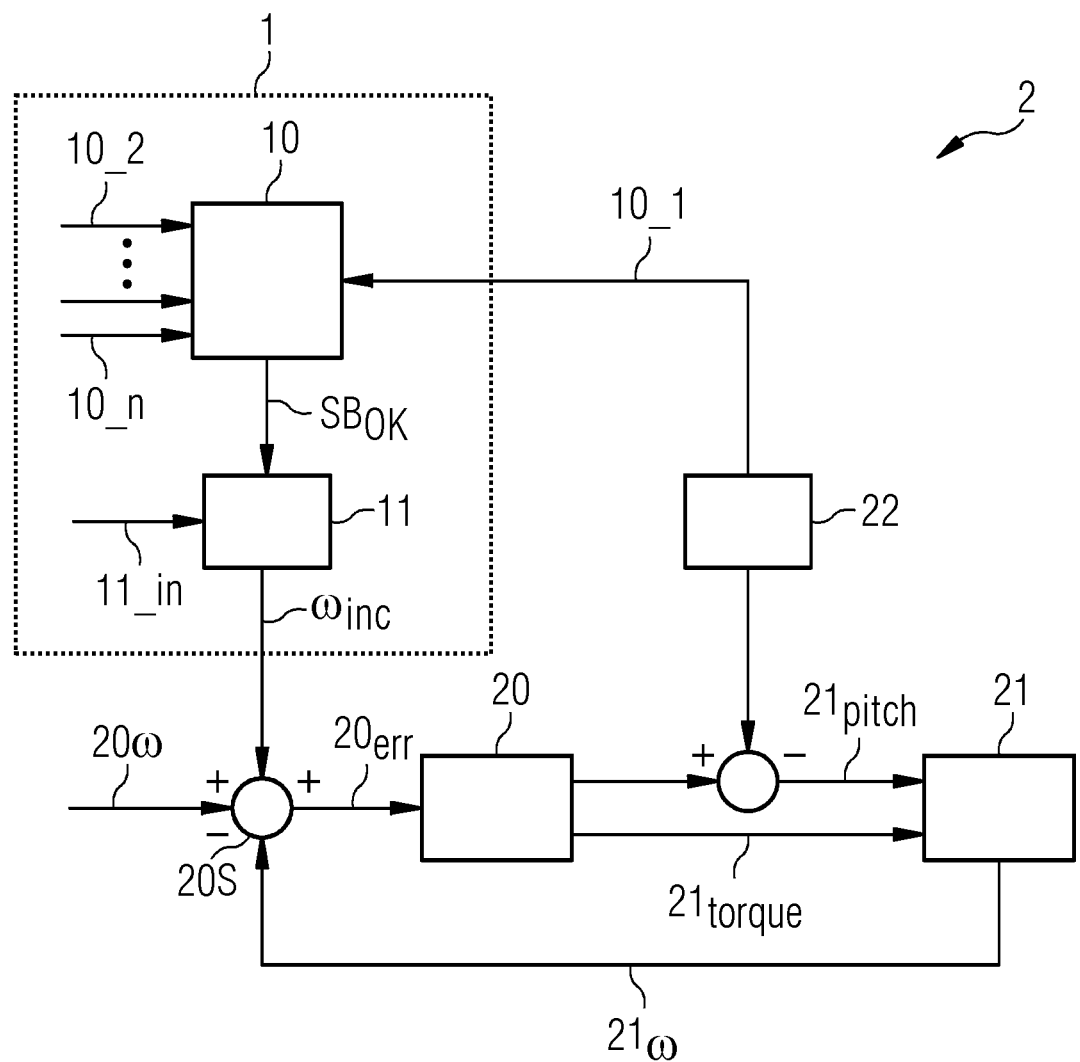
FIG. 1 shows a block diagram of an embodiment of the inventive control arrangement.

Objects in the diagrams are not necessarily drawn to scale. FIG. 1 shows a block diagram of an embodiment of the inventive control arrangement 2. The aerodynamic rotor and the generator are collectively regarded as a power producing unit 21, and the power output of the generator is largely determined by a pitch reference $21_{pitch}$ (to the rotor blades) and a torque (or power reference) reference $21_{torque}$ (to the generator).

The inventive control arrangement 1 comprises a loading analysis module 10 or "mild environmental condition analyser" (MECA) 10 which receives various inputs that provide it with relevant data $10\_1, \ldots, 10\_n$ such as a flap bending moment data $10\_1$ (e.g. from sensors of a blade load limiter module 22), turbulence intensity data (e.g. from a LIDAR unit), tower loading data, yaw position data, etc. From this information, the MECA 10 can assess the present environmental condition for the wind turbine, and can decide whether or not to allow a speed boost. This decision is output as a speed boost approval signal $SB_{OK}$ to a speed boost module 11. A boost level $11\_in$, i.e. the extent by which rotor speed can be increased, is provided to the speed boost module 11. The boost level $11\_in$ may be a predetermined parameter or setting, and can place a limit on the maximum allowed boost. Within the constraint of this maximum allowed boost, the speed boost module 11 can then set one or more speed increments ωinc in order to approach this maximum $11\_in$. For example, successive speed increments ωinc can gradually approach the maximum $11\_in$ in several small steps. The intended speed increment ωinc is then added to a speed reference 200 at summation module 20S. The speed reference 200 can originate from a park controller (not shown).

The delta or speed reference error $20_{err}$ between target speed and actual speed 210 is input to a speed control module 20, which then computes a target pitch reference and a torque reference $21_{torque}$.

In this exemplary embodiment, the target pitch reference is modified by a load limitation offset provided by a blade load limiter 22. The corrected pitch reference 21 pitch and the torque reference $21_{torque}$ are then used to control the aerodynamic rotor and the generator in order to achieve the target rotational speed (speed reference 200 plus speed increment $\omega_{inc}$) and the target output power.

Figure 2:
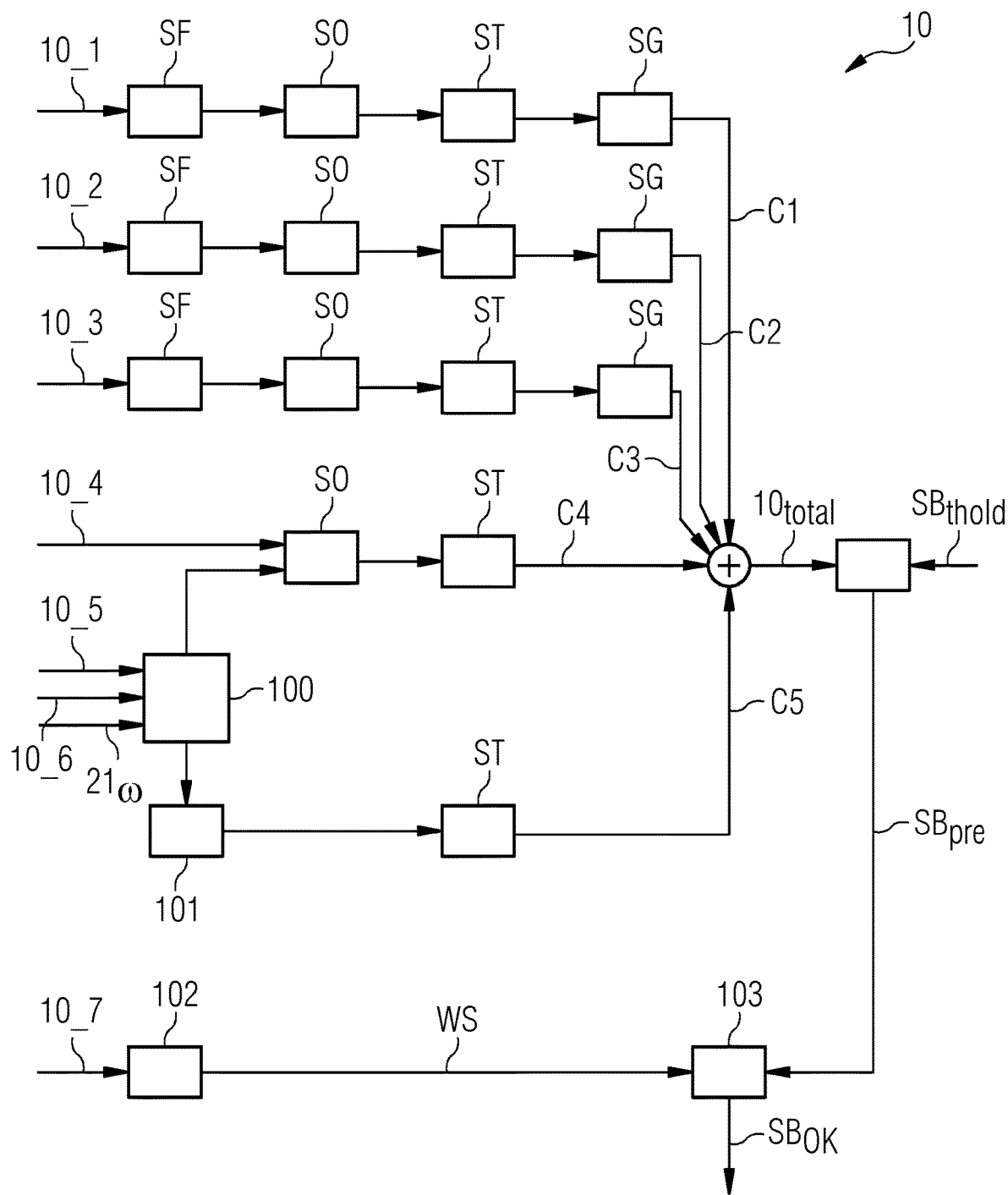
FIG. 2 shows a block diagram of an embodiment of the loading analysis module of FIG. 1.

FIG. 2 shows a block diagram of an embodiment of the MECA 10 module of FIG. 1. Here, each input signal $10\_1, \ldots, 10\_n$ is processed in various stages SF, SO, ST, SG to determine its contribution to the ultimate "boost speed" decision $SB_{OK}$. Depending on the type of input signal $10\_1, \ldots, 10\_n$, it can be processed by a filter stage SF and/or an operator stage SO and/or a threshold stage ST and/or a gain stage SG. Depending on the nature of the input signal $10\_1, \ldots, 10\_n$, the filter type of a filter stage SF can be any of low-pass, band-pass, high-pass etc.; the operator of an operator stage SO can be any of computation of standard deviation, absolute value, maximum value, etc.; the threshold stage ST can determine whether or not its input reaches a required threshold for it to be included in the final decision; the gain stage can determine the weighting of a partial contribution C1, ..., C5. These considerations apply to input signals such as a LIDAR input $10\_2$, a blade load sensor input $10\_1$, a sensor input $10\_3$ such as a wind speed sensor, etc.

The pitch position $10\_5$, active power $10\_6$ and actual rotor speed value 210 are fed to a look-up table 100 which returns a wind speed estimate which is then used by a turbulence estimator module 101 to obtain an estimate of the local turbulence intensity. The look-up table 100 can also deliver a thrust estimate, which is processed in conjunction with a tower acceleration input $10\_4$.

The partial contributions C1, ..., C5 resulting from the processing stages are summed to obtain a value for total loading $10_{total}$, which is then compared to a sum threshold $SB_{thold}$. If the total loading $10_{total}$ is less than the threshold $SB_{thold}$, the rotational speed can in principle be boosted, and this possibility is indicated by the preliminary speed boost $SB_{pre}$ signal.

In this exemplary embodiment, the decision to increase or boost the rotational speed also depends on the "wake position" of the wind turbine, i.e. whether or not the wind turbine is in the wake of another wind turbine, since the likelihood of excessive loading increases significantly when a wind turbine is in the wake of another wind turbine. To this end, the yaw attitude $10\_7$ of the wind turbine is fed to a wake module 102, which can avail of a park layout look-up table. The wake module 102 may also be informed of the yaw positions of other relevant wind turbines in the wind park. With this information, the wake module 102 can establish whether the wind turbine is in wake or out of wake. The wake state WS can be "true" (wind turbine is in wake) or "false" (wind turbine is out of wake), for example. A boost approval module 103 receives the wake state WS and the initial speed boost $SB_{pre}$ signal, and decides whether or not speed boost is approved. This boost approval module 103 prevents speed boost when the wind turbine is "in wake", and enables speed boost as soon as the wind turbine is "out of wake". Effectively, a positive speed boost $SB_{OK}$ signal to enable rotor speed boost is issued only when a wind turbine is out of wake, i.e. this wind turbine is not currently affected by the wake of an upstream wind turbine.

Figure 3:
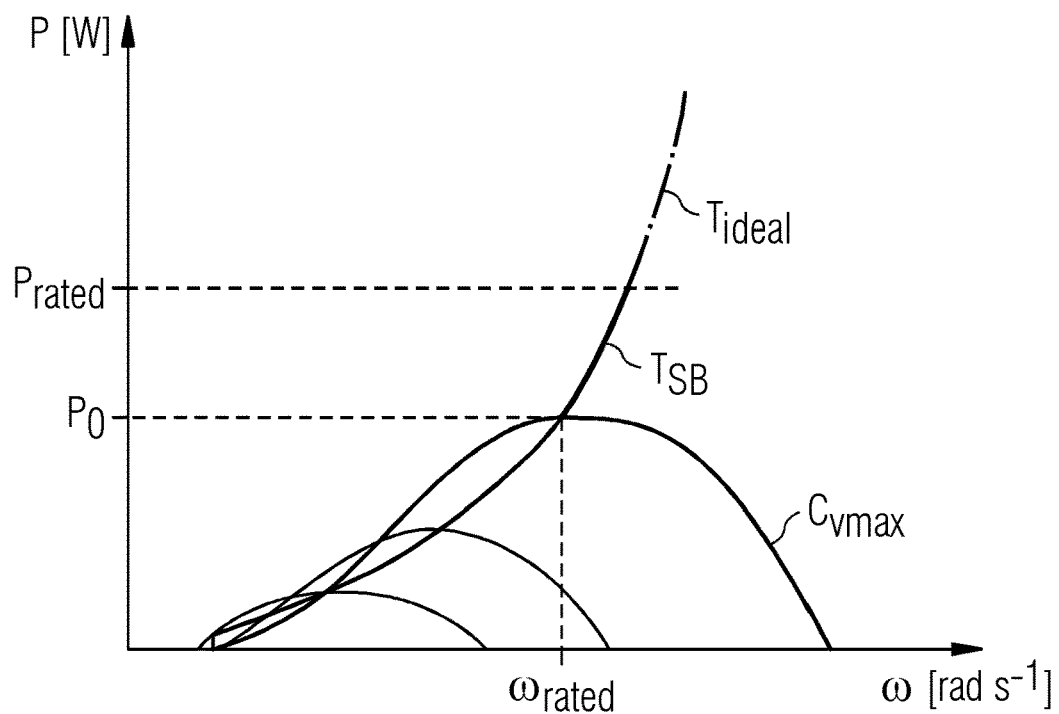
FIG. 3 shows a speed/power chart of a wind turbine controlled using the inventive method.

FIG. 3 shows several speed/power curves of a wind turbine type, with power P (in Watts) along the Y-axis, and rotational speed ω (in radians per second) along the X-axis. It shall be understood that there is an infinite number of speed/power curves and the diagram only shows a few for the sake of clarity.

Each of the curves shown in the diagram is associated with a specific integer wind speed and has a maximum power output value at a specific rotational speed. The curve $C_{vmax}$ corresponds to the wind speed vmax at which the wind turbine can reach its rated speed ωrated. The diagram also shows the ideal trajectory $T_{ideal}$ for that wind turbine type. Each point along the ideal trajectory $T_{ideal}$ is the maximum of speed/power curve. For the curve $C_{vmax}$, the rated speed ωrated is associated with output power P0. The output power P0 which can be reached when the wind turbine is operating at its rated ωspeed ωrated is less than the achievable rated output power $P_{rated}$ for that class of wind turbine.

When the wind turbine is being operated at its rated speed $\omega_{rated}$, the loading analysis module continually monitors the loading to assess whether it is safe to increase the rotor speed. If a speed boost is approved, the rotor speed can be tentatively raised, allowing the wind turbine to adhere to the ideal trajectory $T_{ideal}$. Starting from the maximum of curve $C_{vmax}$, the output power can increase from the initial level $P_0$ to its rated output power $P_{rated}$ while adhering to the ideal trajectory $T_{ideal}$. In this way, the wind turbine can be controlled to extract the maximum possible amount of energy from the wind when this has increased (to within a safe level) beyond the rated wind speed for that wind turbine class. As a result, the AEP of the wind turbine can be increased significantly.

With the inventive control approach, it is possible to maximise the power coefficient of a wind turbine type by identifying the mild environmental conditions that allow a careful increase in rotational speed. Instead of issuing references to maintain the rotational speed at the rated value $\omega_{rated}$ even if the wind speed is higher than the rated wind speed $v_{max}$, the rotational speed is allowed to gradually increase so that the power/speed relationship $T_{SB}$ can follow the ideal trajectory $T_{ideal}$. Of course, as soon as the loading is deemed to be excessive, the rotational speed is reduced again towards its rated speed (or below the rated speed, as the case may be), again following the optimal power/speed trajectory $T_{SB}$.

Figure 4:
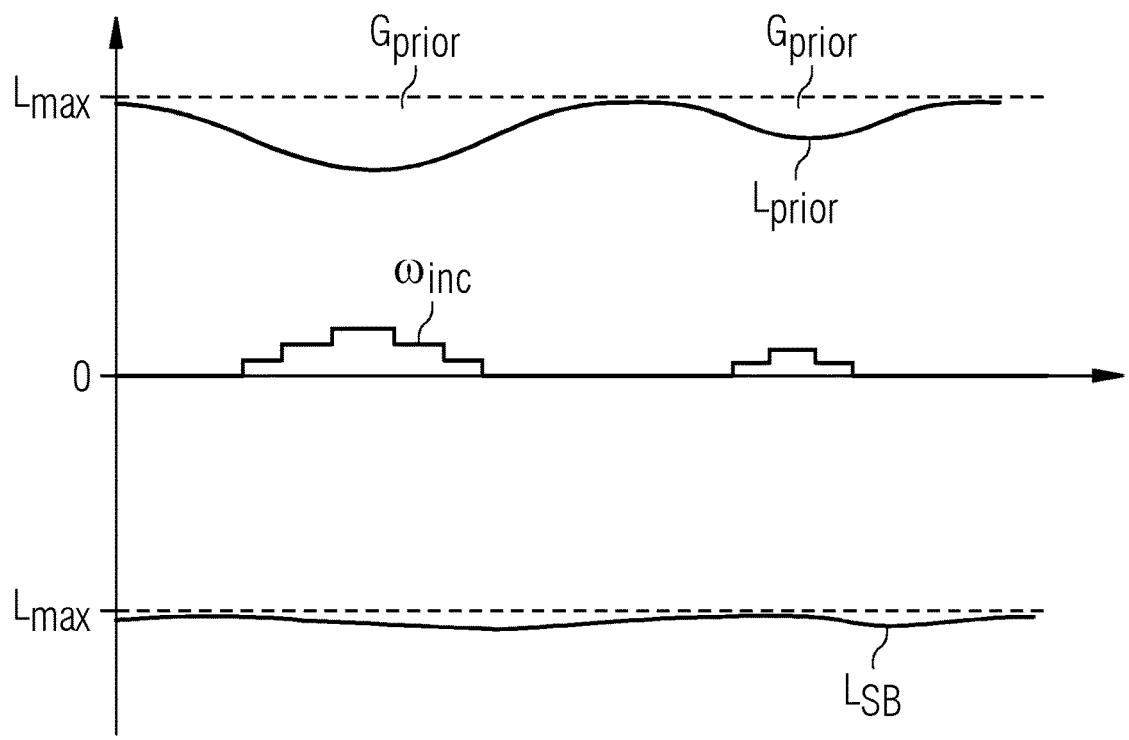
FIG. 4 illustrates the incremental speed boost of the inventive method.

FIG. 4 illustrates the incremental speed boost performed by the inventive method during operation of a wind turbine. The diagram shows cumulative wind loading $L_{prior}$ on a wind turbine controlled by a prior art control technique to operate at or near its rated speed. The cumulative wind loading $L_{prior}$ fluctuates according to collective changes in the environmental conditions, e.g. changes in turbulence, tower loading, wind speed, etc. A loading threshold $L_{max}$ for that wind turbine is indicated as a constant value.

Embodiments of the invention are based on the premise that the loading on wind turbine is often less than a specified loading threshold $L_{max}$. Embodiments of the invention aim to remedy the loss in efficiency arising from the "gaps" $G_{prior}$ between the loading threshold and the actual loading, since these "gaps" $G_{prior}$ indicate that the wind turbine is not extracting the maximum energy from the wind. In the inventive method, the total loading is estimated as explained in FIG. 2, and compared to a loading threshold (e.g. total load $10_{total}$ is compared to threshold $SB_{thold}$ in FIG. 2). If the wind turbine is not in wake, the rotor speed can be increased to follow the ideal trajectory as explained above.

The diagram shows an exemplary speed boost increments $\omega_{inc}$ (in rad/s) that are added to the speed reference 200 as explained in FIG. 1. A speed boost increment $\omega_{inc}$ is determined by the MECA 10 and the speed boost module 11 according to the observed loading on the wind turbine as explained above. As long as the actual loading does not exceed the loading threshold, the speed of the aerodynamic rotor may be carefully increased. The diagram shows the outcome of the inventive control method in the form of the more optimal cumulative loading $L_{SB}$, indicating that the wind turbine is able to always extract the maximum energy from the wind.

Figure 5:
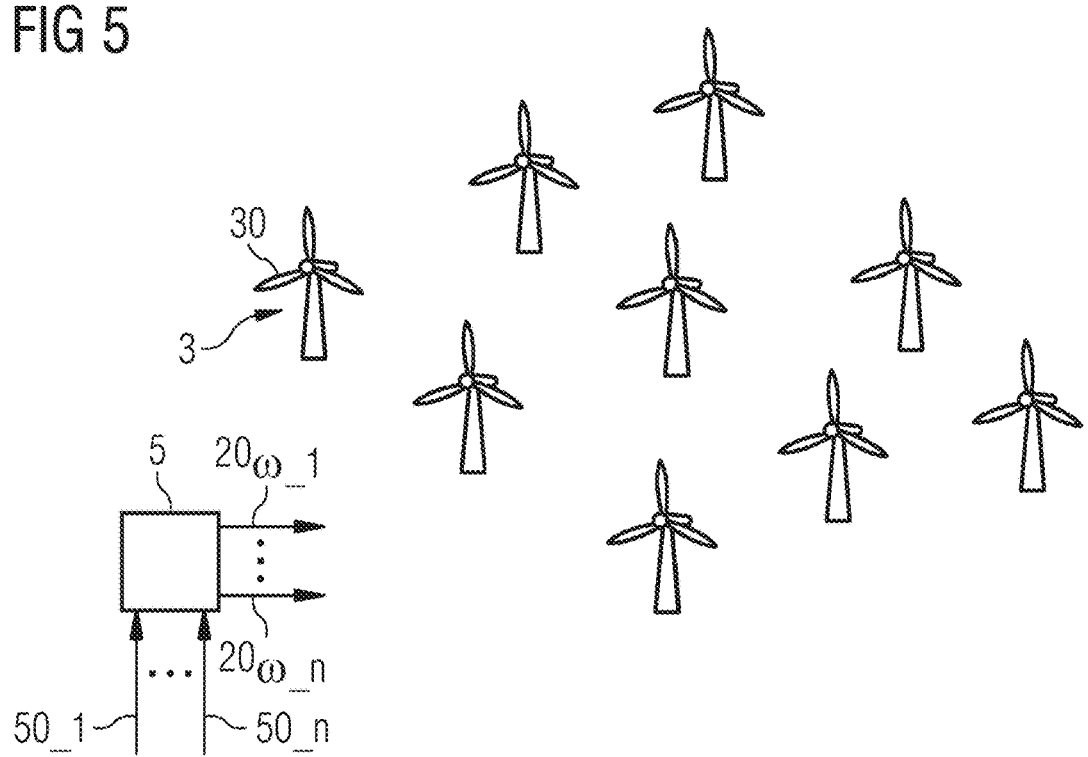
FIG. 5 shows an exemplary wind park.

FIG. 5 shows an exemplary wind park, with a plurality of wind turbines 3 arranged in a suitable formation. A park controller 5 issues speed references $20\omega\_1, \ldots, 20\omega\_n$ to the wind turbines 3 on the basis of input data $50\_1, \ldots, 50\_n$ such as power demand input, turbine capacity, meteorological data, etc. An upstream wind turbine is not exposed to the wake of any other wind turbine and can be given a high speed reference for its aerodynamic rotor 30.

Figure 6:
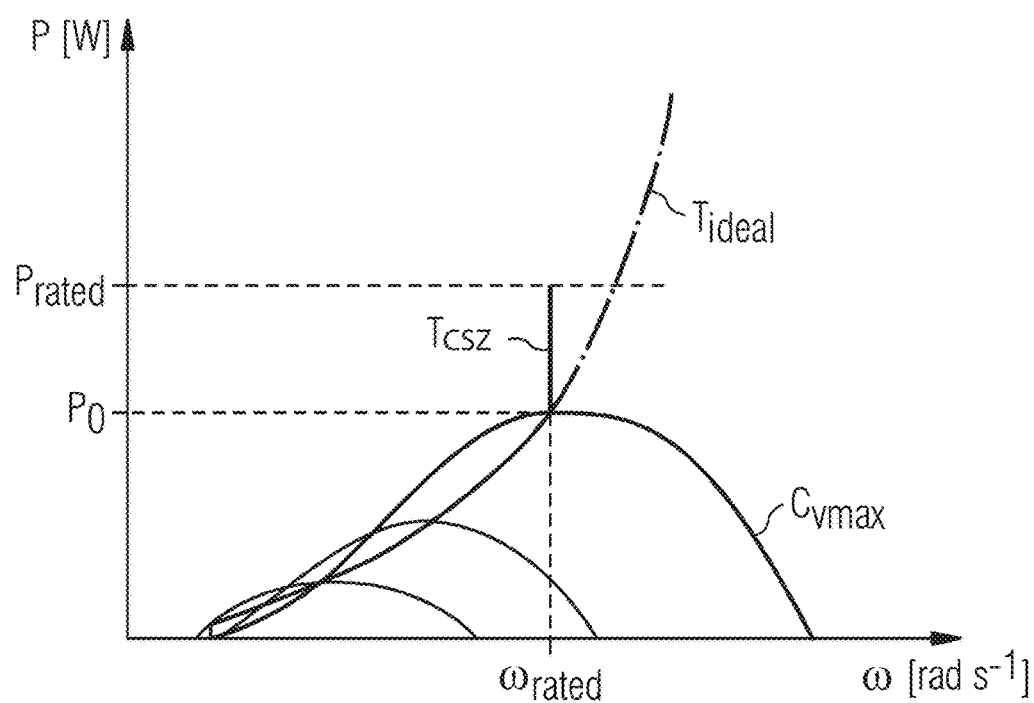
FIG. 6 shows a speed/power chart of a wind turbine controlled using a prior art approach.

As explained in the introduction, FIG. 6 shows several speed/power curves for of a wind turbine type, with power P (in Watts) along the Y-axis, and rotational speed ω (in radians per second) along the X-axis. It shall be understood that there is an infinite number of speed/power curves and the diagram only shows three for the sake of clarity. The curve $C_{vmax}$ corresponds to the wind speed $v_{max}$ at which the wind turbine can reach its rated speed ω rated. The diagram also shows the ideal trajectory $T_{ideal}$ for that wind turbine type. Each point along the ideal trajectory $T_{ideal}$ is the maximum of speed/power curve. For the curve $C_{vmax}$, the rated speed $\omega_{rated}$ is associated with output power $P_0$.

Using the prior art control techniques, the ideal trajectory $T_{ideal}$ can only be followed for a wind speed that does not exceed $v_{max}$. If the wind speed increases beyond $v_{max}$, the rotational speed is maintained at the rated value $\omega_{rated}$, and any increase in power output must follow the vertical trajectory $T_{CSZ}$, and can only be achieved by equipping the rotor blades with physical add-ons such as serrations, vortex generators, etc. Starting from the maximum of curve $C_{vmax}$, the output power can theoretically increase from the initial level $P_0$ to its rated output power $P_{rated}$. In this "constant speed zone" defined by bounds $P_0$-$P_{rated}$, the output power follows the sub-optimal vertical trajectory $T_{CSZ}$. If the wind turbine is not constructed to achieve this power boost, the difference between actual and achievable output power results in an unnecessary reduction in AEP.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A control arrangement for a variable-speed wind turbine constructed to fulfil requirements of a wind class as defined by IEC 61400-1, the control arrangement comprising:
a controller configured to:
analyze a plurality of environment values to establish whether a momentary wind turbine loading is lower than a loading threshold when a rotational speed of an aerodynamic rotor has reached a rated value, wherein a rated speed is associated with a level of output power that is less than a rated output power for a class of wind turbine; and
apply a speed increment to the rotational speed of the aerodynamic rotor if the wind turbine loading is lower than the loading threshold, and wherein a power/speed relationship follows an ideal trajectory for the class of wind turbine.

2. The control arrangement according to claim 1, wherein the plurality of environment values comprise any of: a blade load value, a turbulence intensity value, a tower acceleration value, and a yaw position value.

3. The control arrangement according to claim 1, wherein the controller is further configured to receive a pitch position value, an active power value, and a rotor speed value.

4. The control arrangement according to claim 3, wherein the controller is further configured to estimate a local turbulence intensity on a basis of the pitch position value, the active power value, and the rotor speed value.

5. The control arrangement according to claim 1, wherein the controller is further configured to process an environment value according to a relevant threshold.

6. The control arrangement according to claim 1, wherein the controller is further configured to compute a partial contribution of each environment value and to enable, on a basis of a sum of the partial contributions, an increase of rotational speed by the speed increment.

7. The control arrangement according to claim 1, wherein the controller is further configured to determine a wake exposure of the wind turbine and to enable, on a basis of the wake exposure, an increase of rotational speed by the speed increment.

8. The control arrangement according to claim 1, wherein the controller is further configured to determine a magnitude of a speed increment on a basis of an estimated turbulence level and/or an estimated load level.

9. A variable-speed wind turbine comprising the control arrangement according to claim 1, which is configured to augment a speed reference by the speed increment.

10. The variable-speed wind turbine according to claim 9, constructed to fulfil requirements of a turbulence class as defined by IEC 61400-1.

11. A method of operating a variable-speed wind turbine, the method comprising:

establishing whether a momentary wind turbine loading is lower than a loading threshold when a rotational speed of an aerodynamic rotor has reached a rated speed, wherein the rated speed is associated with a level of output power that is less than a rated output power for a class of wind turbine;

determining a speed increment for the rotational speed of the aerodynamic rotor on a basis of an ideal power/speed trajectory of the wind turbine if the wind turbine loading is lower than the loading threshold; and increasing a rotor speed by the speed increment.

12. The method according to claim 11, further comprising augmenting a speed reference by the speed increment.

13. The method according to claim 11, further comprising identifying a wake exposure of the wind turbine.

14. The method according to claim 13, wherein the rotational speed of the aerodynamic rotor is increased only if the wind turbine is not in a wake of another wind turbine.

\* \* \* \* \*